United States Patent
Fairley et al.

(10) Patent No.: US 11,120,092 B1
(45) Date of Patent: Sep. 14, 2021

(54) OPTIMIZATION OF LINKS TO ELECTRONIC CONTENT

(71) Applicant: Microsoft Technology Licensing, LLC, Redmond, WA (US)

(72) Inventors: Michael Charles Zinzan Fairley, Sunnyvale, CA (US); Shen Huang, San Jose, CA (US); Huan Hoang, San Jose, CA (US); Yongzheng Zhang, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 147 days.

(21) Appl. No.: 16/235,193

(22) Filed: Dec. 28, 2018

(51) Int. Cl.
| | |
|---|---|
| *G06F 16/95* | (2019.01) |
| *G06F 16/9538* | (2019.01) |
| *G06F 16/953* | (2019.01) |
| *G06F 16/955* | (2019.01) |
| *G06F 16/93* | (2019.01) |

(52) U.S. Cl.
CPC .......... *G06F 16/9538* (2019.01); *G06F 16/94* (2019.01); *G06F 16/953* (2019.01); *G06F 16/9558* (2019.01)

(58) Field of Classification Search
CPC .................................................. G06F 16/9538
USPC ....................................................... 707/726
See application file for complete search history.

(56) References Cited

U.S. PATENT DOCUMENTS

| | | | | |
|---|---|---|---|---|
| 2016/0063590 A1* | 3/2016 | Subramanya | ....... | G06F 16/9024 705/26.61 |
| 2016/0267199 A1* | 9/2016 | Yanagisawa | ........ | G06F 16/9024 |
| 2017/0116658 A1* | 4/2017 | Baid | ................. | G06Q 30/0625 |
| 2019/0347668 A1* | 11/2019 | Williams | ............ | H04L 67/2833 |
| 2020/0111027 A1* | 4/2020 | Qin | ..................... | G06F 16/9535 |

OTHER PUBLICATIONS

FERCOQ, et al., "Ergodic Control and Polyhedral approaches to PageRank Optimization", Retrieved at: https://arxiv.org/pdf/1011.2348.pdf, Sep. 20, 2011, 39 Pages.
Fishkin, Rand, "Should SEOs Care About Internal Links?—Whiteboard Friday", Retrieved From: https://moz.com/blog/should-seos-care-about-internal-links-whiteboard-friday, May 26, 2017, 45 Pages.

* cited by examiner

*Primary Examiner* — Syling Yen
(74) *Attorney, Agent, or Firm* — Schwegman Lundberg & Woessner, P.A.

(57) ABSTRACT

A method and system for determining links for a linking page are provided. For each linking page of a plurality of linking pages, a similarity score between each linking page and each linked-to page is generated. Each linked-to page is associated with each linking page. Based on the similarity scores generated for each linking page, a set of linked-to pages for each linking page is identified. An importance score for the linking page is also generated. Identities of the plurality of linking pages, identities of the set of linked-to pages identified for each linking page, and the importance score for each linking page are stored as input. Based on the input, for each linking page, a subset of the set of linked-to pages identified for each linking page is assigned by a model.

16 Claims, 7 Drawing Sheets

POPULAR SEARCHES

SAN FRANCISCO JOBS 215A
MOUNTAIN VIEW JOBS 215B
MENLO PARK JOBS 215C
REDWOOD CITY JOBS
SOUTH SAN FRANCISCO JOBS
SCIENTIST JOBS
BERKELEY JOBS
WALNUT CREEK JOBS
SAN RAMON JOBS
SANTA ROSA JOBS

OTHER PEOPLE ALSO LIKE

LOS GATOS JOBS
LIVERMORE JOBS
RANCHO CORDOVA JOBS 220A
ASSOCIATE SCIENTIST JOBS 220B
RESEARCH TECHNICIAN JOBS 220C
CLINICAL LABORATORY SCIENTIST JOBS
BIOMEDICAL ENGINEER JOBS
SCIENTIST JOBS IN SAN FRANCISCO
MEDICAL LABORATORY SCIENTIST JOBS
SCIENTIST JOBS IN SOUTH SAN FRANCISCO

---

DATA SCIENTIST 210A — 8 d
NAUTO
PALO ALTO, CA, US   MORE PALO ALTO JOBS >
WORK WITH LARGE DATASETS TO DISCOVER INSIGHTS HELPFUL IN...

DATA SCIENTIST 210B — 14 d
TSYS
SAN MATEO, CA, US   MORE SAN MATEO JOBS >
NETSPEND IS LOOKING FOR A DATA SCIENTIST WHO IS...

DATA SCIENTIST 210C — 19 d
ROBLOX
SANTA MARIA, CA, US   MORE SANTA MARIA JOBS >
POWERED BY A GLOBAL COMMUNITY OF MILLIONS OF...

DATA SCIENTIST — 14 d
PALO ALTO NETWORKS
SANTA CLARA, CA, US   MORE SANTA CLARA JOBS >
0-3 YEARS WORKING EXPERIENCE IN ANALYTICS, DATA MINING, ...

DATA SCIENTIST — 20 d
APPZEN

| LINKED IN | | SIGN IN | JOIN NOW |

| EMAIL ADDRESS | CREATE JOB ALERT | YOU CAN CANCEL JOB ALERTS AT ANY TIME. |

1 2 3 4 5 6 7 8 9 10  NEXT →

INVEST IN A ROBOT?
ROBOTICS + BLOCKCHAIN + AI + THE
MOST EXCITING FRANCHISE OPPORTUNITY!
COMPUTER

INVITATION FROM LINKEDIN
PLACE ADS ON LINKEDIN.
ACQUIRE NEW CUSTOMERS FOR
YOUR BUSINESS. TRY IT NOW.          AD

POPULAR SEARCHES

| APPLICATION SCIENTIST JOBS | SCIENTIST JOBS IN PALO ALTO 225A | SCIENTIST JOBS IN FREMONT 225B |
| BIOCHEMIST JOBS | SENIOR SCIENTIST JOBS IN SOUTH SAN JOSE 225C | SENIOR SCIENTIST JOBS IN REDWOOD CITY |
| SENIOR SCIENTIST JOBS IN SUNNYVALE | RESEARCH TECHNICIAN JOBS IN SAN FRANCI... | ASSOCIATE SCIENTIST JOBS IN REDWOOD CITY |
| STAFF RESEARCH ASSOCIATE JOBS | ASSOCIATE SCIENTIST JOBS IN SAN MATEO | ASSOCIATE SCIENTIST JOBS IN SUNNYVALE |
| MOLECULAR BIOLOGIST JOBS PLEASANTON | SCIENTIST JOBS PLEASANTON | PRINCIPAL SCIENTIST JOBS IN SUNNYVALE |
| SENIOR SCIENTIST JOBS IN SOUTH SAN FRAN... | FIELD APPLICATION SCIENTIST JOBS IN SAN F... | SENIOR SCIENTIST JOBS IN SANTA CLARA |
| ASSOCIATE SCIENTIST JOBS IN SOUTH SAN FR... | CLINICAL LABORATORY SCIENTIST JOBS IN SAN... | ASSOCIATE SCIENTIST JOBS IN SAN BRUNO |
| SCIENTIST JOBS IN REDWOOD CITY | SENIOR SCIENTIST JOBS IN BERKELEY | SCIENTIST JOBS IN SOUTH SAN JOSE |

224

JOBS/DATA SCIENTIST JOBS/SUNNYVALE, CA          LEARN MORE ABOUT DATA SCIENTIST POSITIONS

*FIG. 2C*

OPTIMIZATION OF LINKS TO ELECTRONIC CONTENT

TECHNICAL FIELD

The present disclosure relates to electronic content delivery across one or more computer networks and, more particularly to, optimization of links to electronic content.

BACKGROUND

The Internet allows end users operating computing devices to be presented with electronic content that is relevant to a search inquiry. Often times, the end users may not only view a web page that includes the electronic content that is presented in response to the search inquiry, but also additional electronic content that is accessible through links on the web page, because the end users may find that the additional electronic content accessible by the links are also relevant to the search result.

As the number of web platforms increases, there has been a need to implement a global link structure to the electronic content that is available on a particular web platform to present electronic content that is relevant to the search query and satisfies the end user's search criteria. The global link structure may also impact the authority and quality of the electronic content and can provide an optimal and improved result for additional electronic content, yet present technology does not consider a global link structure of a web platform in which the electronic content is posted.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIGS. 2A-2C are screen snapshots of example user interfaces for presenting electronic content with links to other pages with additional electronic content, in an embodiment;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments are disclosed in sections according to the following outline:

1. GENERAL OVERVIEW
 1.1. TECHNICAL IMPROVEMENTS
2. SYSTEM OVERVIEW
3. EXAMPLE COMPUTER-GENERATED GRAPHICAL USER INTERFACES
4. FUNCTIONAL DESCRIPTION
5 MODEL ALGORITHMS
 5.1. MARKOV DECISION PROCESS
 5.2. VALUE ITERATIONS ALGORITHM AND VARIABLES
 5.3. NODES AND EDGES SCHEMA AND DATA VALIDATION
6. HARDWARE OVERVIEW

1. General Overview

A method and system for determining links to pages ("linked-to pages") for a linking page are provided. For a set of linking pages a similarity score is generated for all pairwise combinations of pages within the set. Based on the similarity scores generated for each linking page, a set of linked-to pages for each linking page is identified. An importance score for the linking page is also generated. Identities of the linking pages, identities of the set of linked-to pages identified for each linking page, and the importance score for each linking page are stored as input. Based on the input, for each linking page, a subset of the set of linked-to pages is assigned by a model.

1.1 Technical Improvements

Embodiments described herein improve the utility of electronic content delivery methods for end users by providing related and relevant electronic content in response to a search query. Embodiments improve user experience and interaction with a computing device by maximizing organic traffic by presenting electronic content that ensures fairness and equity of data. Embodiments described herein also improves the scalability of data by automatically selecting link structures for web pages and ensuring mathematical optimality.

2. System Overview

Figure 1A:
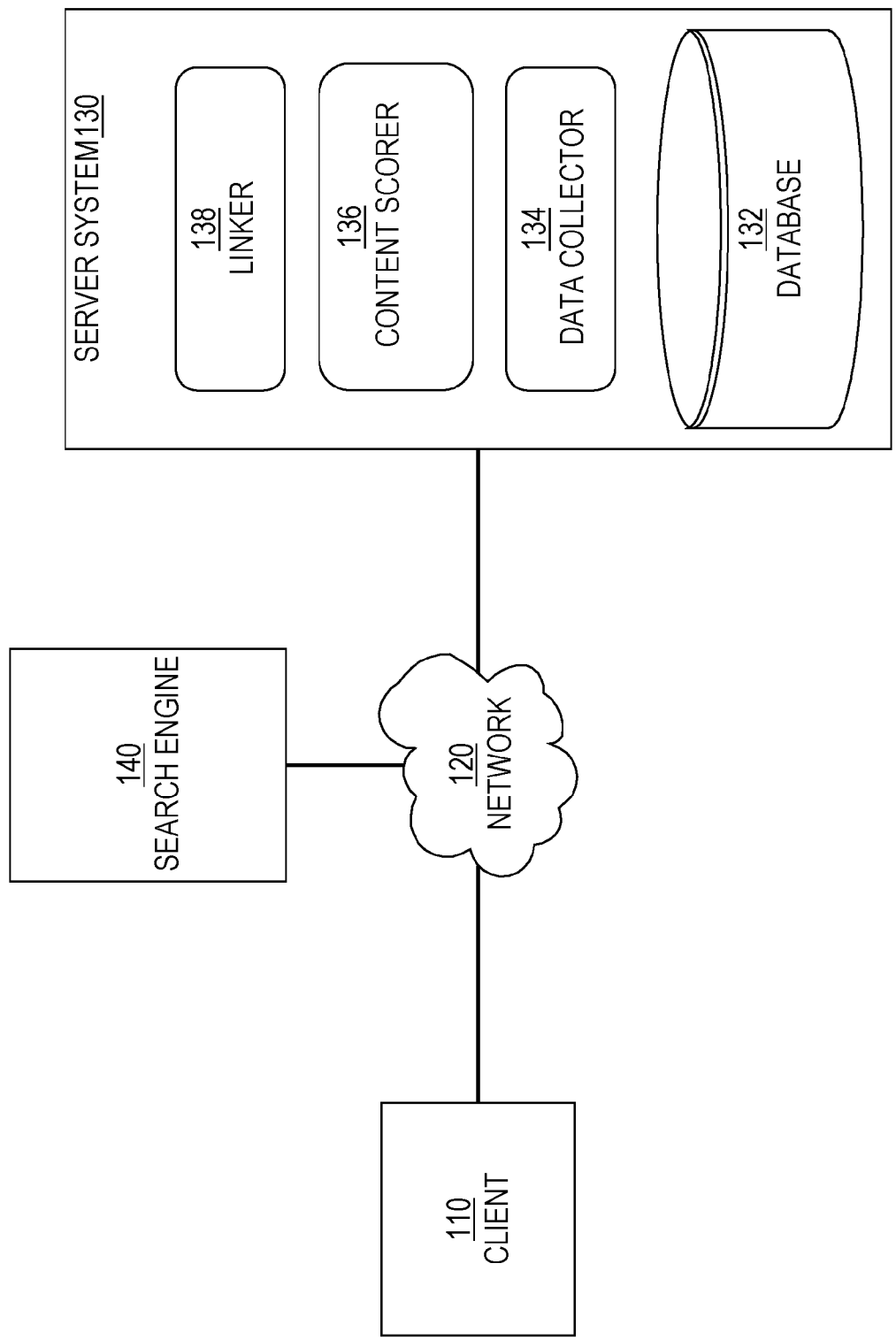
FIG. 1A is a block diagram that depicts an example system for determining content to which one or more web pages of a website should link, in an embodiment.

FIG. 1A is a block diagram that depicts an example system 100 for determining content to which one or more web pages of a website should link, in an embodiment. System 100 includes a client device 110, a network 120, a server system 130, and a search engine 140.

Client 110 is an application or computing device that is configured to communicate with server system 130 over network 120. Although only a single client 110 is depicted, system 100 may include multiple clients that interact with server system 130 over network 120. Examples of computing devices include a laptop computer, a tablet computer, a smartphone, a desktop computer, and a Personal Digital Assistant (PDA). An example of an application includes a dedicated application that is installed and executed on a local computing device and that is configured to communicate with server 130 over network 120. Another example of an application is a web application that is downloaded from server system 130 and that executes within a web browser executing on a computing device. Client 110 may be implemented in hardware, software, or a combination of hardware and software.

Network 120 may be implemented on any medium or mechanism that provides for the exchange of data between client 110 and server system 130. Examples of network 120 include, without limitation, a network such as a Local Area Network (LAN), Wide Area Network (WAN), Ethernet or the Internet, or one or more terrestrial, satellite or wireless links.

Server system 130 includes a database 132, a data collector 134, a content scorer 136, and a linker 138. Server system 130 may be implemented on a single computing device or on multiple computing devices. Each of data collector 134, content scorer 136, and linker 138 may be implemented in software, hardware, or any combination of software and hardware. Although depicted separately, data collector 134, content scorer 136, and linker 138 may be implemented as one component.

Database 132 stores data that is used to generate web pages of a particular website (that may be hosted by server system 130), search results, and/or data about accesses to, and user interactions with, the content. A web page is a combination of multiple content that contains zero or more links that link to one or more other web pages. A web page may be linked to by one or more other web pages. Example content includes a text file, an audio file, a video file, and an executable.

Although only one search engine is depicted, system 100 may include multiple search engines. Thus, server system 130 may retrieve search results (and, potentially other data) from multiple search engines. Search engine 140 may be a third-party search engine. Examples of search engine 140 include Bing, Ask, or Google. Search engine 140 is communicatively coupled to the network 120 and the client 110. The search engine 140 supports functions or features hosted by the server system 130. For example, a user can initiate requests on the client 110 for electronic content and the search engine 140 can establish connections with the server system 130 and generate a search result.

The search results stored in database 132 are results of searches that have been previously performed by search engine 140. Each search was performed based on one or more keywords. A search may be initiated by server system 130 and transmitted to search engine 140 over network 120 as an HTTP request that contains one or more keywords and a Uniform Resource Locator (URL) of the search engine 140. Keywords are strings of characters that may be associated with the subject matter of the content.

In database 132, a search result data is associated with keywords that were used to generate the search result data and indicates (or identifies) content (e.g., using content identifier) and position data of the content. Position data may include a search results page number or location number within the search results page (e.g., identifying which page of a search engine result or a location within the search result page the content appeared) and/or a ranking value that indicates where the content appeared in a search engine result relative to other content identified as a result of the corresponding search, such as first, second, third, one hundredth, etc.

Data Collector

Data collector 134 collects data about multiple content items. In order to collect the data, data collector 134 may examine multiple sources of data such as searching search logs indicating user behavior relative to content, submitting search queries to search engine 140 to perform searches and analyzing the results of those searches and text of certain portions of content. Some of the information collected and included in the search engine results are people names, company names, job titles, job skills, salary, location, or learning-related keywords.

Content Scorer

For each content item, content scorer 136 generates a score for the content item based on the data collected by data collector 134 for that content item. As described in more detail herein, content scorer 136 implements an optimization algorithm to determine to which content item/web page a linking page should link. The optimization algorithm uses weights or coefficients for attributes that are considered in generating a score to rank the content items and the web pages.

As described in more detail herein, a score for a content item may take into account one or more attributes pertaining to the content item itself and, optionally, one or more attributes pertaining to a combination of the content item and a linking page (i.e., that links (or might link) to the content). Thus, content scorer 136 generates multiple scores for content, one score for each linking page and each linked-to page. Some pages may be both a linking page and a linked-to page.

Linker

For a particular web page, linker 138 uses the scores relative to multiple candidate content items to select a subset of the candidate content items to which the particular web page should include a link (e.g., a URL). For example, linker 138 may rank the multiple candidate content items based on the associated scores and select the top N candidate content items. Linker 138 then includes a link in the particular web page for each content as a subset.

In an embodiment, linker 138 uses multiple scores for content to rank the content relative to other candidate content. For example, one score for content may indicate the relevance (e.g., similarity) of the content to other content. As a specific example, content may be about a particular job listing that specifies a particular skill. Other content that is determined to have a higher score than a particular threshold score may be one that includes a job listing that includes a similar skill. In another example, one score for content may indicate an importance score (e.g., search volume). Other content that is determined to have a higher score than a particular threshold score may be one that has been searched more frequently.

Example Link Structure

Figure 1B:
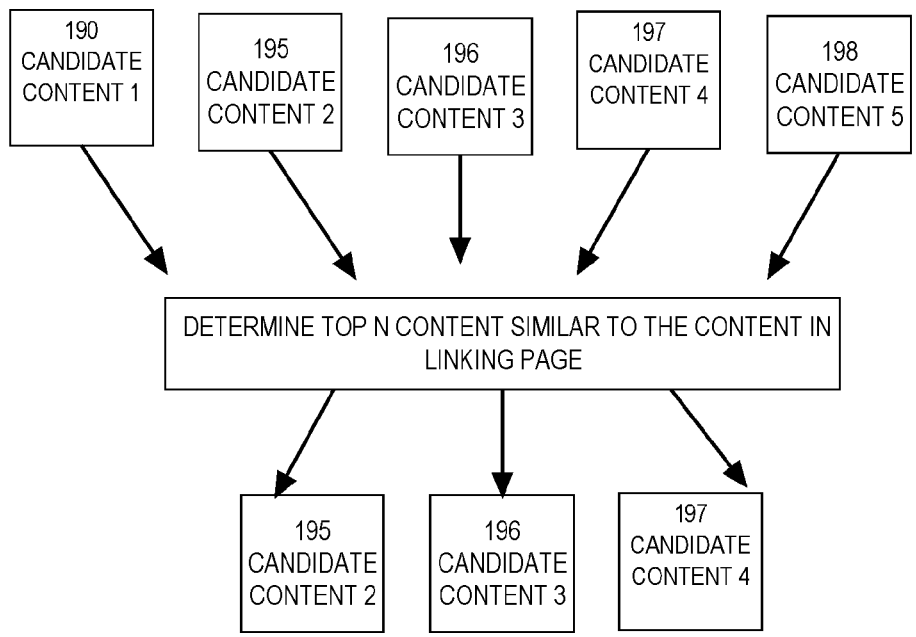
FIG. 1B is a block diagram that depicts a process for selecting one or more content from among candidate content.
Figure 1C:
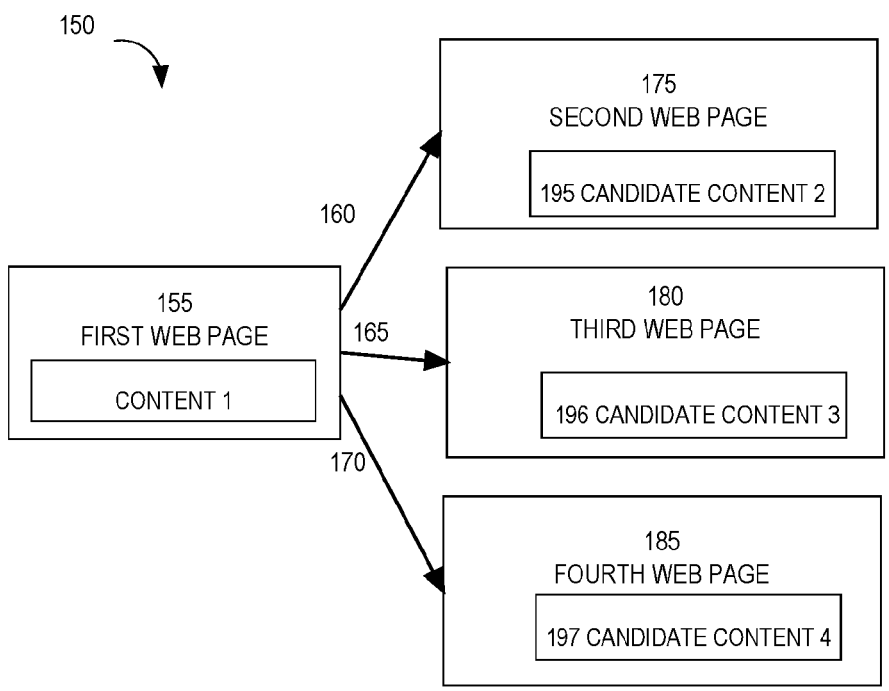
FIG. 1C is a block diagram that depicts, an example link structure from a web page, in an embodiment.

FIG. 1B is a block diagram that depicts selecting a subset of candidate content items 190-198, in an embodiment. FIG. 1C is a block diagram that depicts, an example link structure 150 from first web page 155, in an embodiment. Data collector 134 collects data about each of candidate content item 190-198. Content scorer 136 generates a score for each of the content items. Linker 138 ranks the content items by the score, selects content items that will be presented on the first web page 155, and includes links 160-170 to those content items, respectively.

For example, as shown in FIG. 1C, first web page 155 includes links 160-170 to, respectively, web pages 175-185 with the selected content items 195-197. In this example, first web page 155 is a linking page and second web page 175, third web page 180, and fourth web page 185 is linked-to pages. Each linked-to page includes respective content items 195-197, each content item included in the respective linked-to page is selected based on the similarity score and importance score. One or more of linked-to pages 175-185 with content items 195-197 may be linked to by one or more other web pages (not depicted).

Also, in this example, the slots in web page 155 to include links to content items are ordered. Thus, based on the score, content item 195 may be considered to be in the "first" slot of the first web page 155.

Scoring Content

Multiple attributes may be considered when scoring content. Example attributes of scoring content include:
 a. Content relevance (relevance score): a similarity score between the content of a first web page and particular content on other pages.
 b. Search volume (importance score): a number of times that the particular content has been searched in the past time period (e.g., past day, week, or month, etc.), where each search involves using a keyword(s) in the corresponding search query associated with the content;
 c. Current search ranking of web page and content (importance score): a ranking of the web page or particular content in a search results page when the web page or the particular content is (or is included in) a search query that triggers the search results page
 d. Number of internal links (importance score): a number of links from first web page to the particular content (e.g., minimum and maximum links)

3. Example Computer-Generated Graphical User Interfaces

Figure 2A:
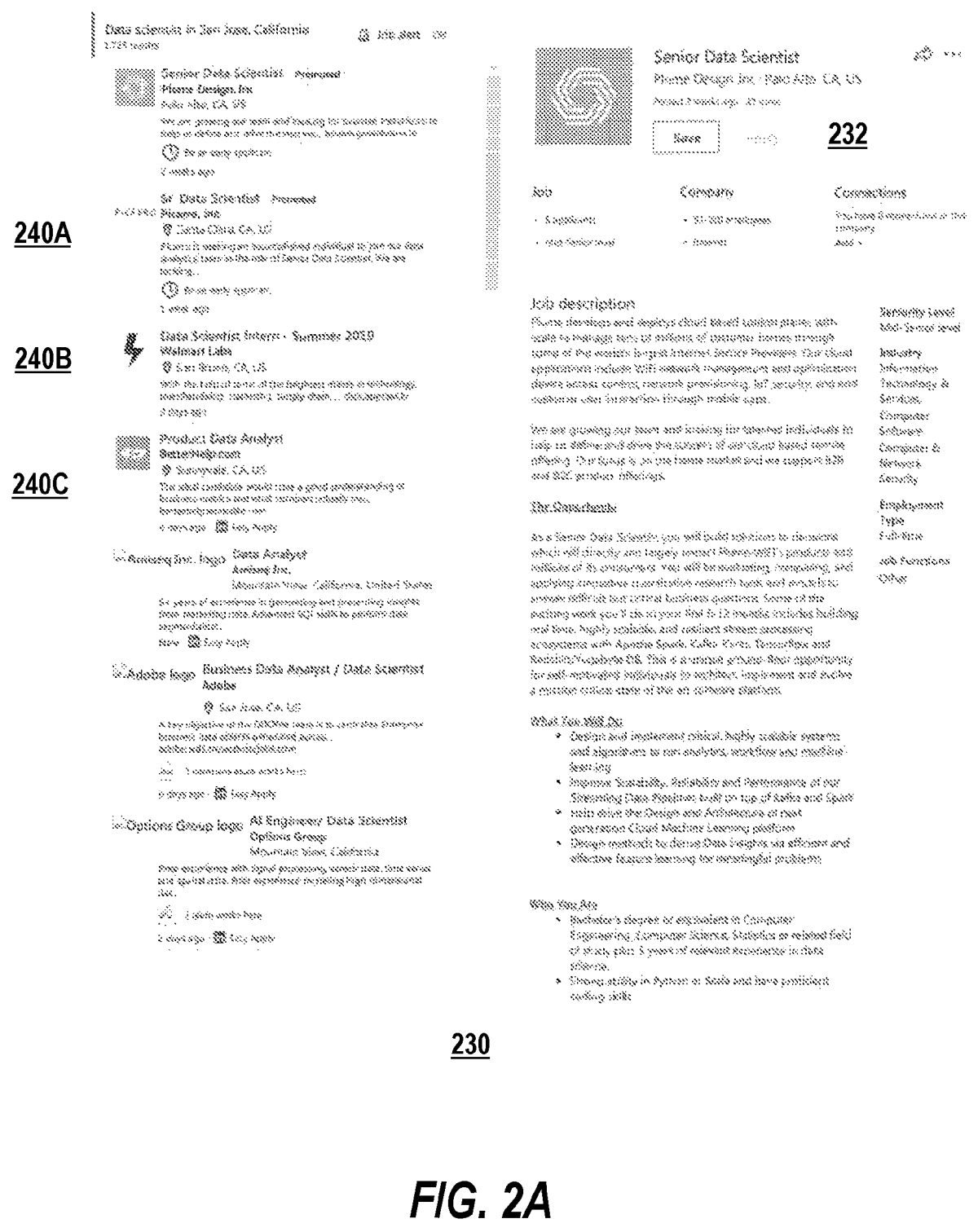

FIG. 2A is a screen snapshot of a first example computer-generated graphical user interface that displays electronic content and links to other pages with additional electronic content.

The electronic content includes any of text, image, video, or link that is presented on a web page or an application. Non-limiting examples of electronic content include job postings, user profiles, learning content, and company profiles. To describe embodiments, electronic content related to a job posting is used herein. One or more attributes related to a job posting such as a job title, job location, job description, and employer name may be used herein for describing the embodiments.

In some embodiments, the screen display can be illustrated as a linking page 230 and links 240A-240C to other pages. In one embodiment, the other pages are "linked-to pages" with respect to linking page 230 by links 240A-240C. Upon clicking one of links 240A-240C, a new page (e.g., linked-to page) that shows one or more job postings similar to job posting 232 presented on the linking page 230 may be displayed. Thus, linking page 230 may be considered a first page with electronic content and a linked-to page is considered a second page with additional electronic content.

Linking page 230 may include a search result that is responsive to a search query. For example, linking page 230 may include a search result which corresponds to job posting 232 that is presented in response to a job search request (e.g., data scientist). Job posting 232 is presented in a main panel of linking page 230. In one embodiment, the linking page can be a JD (Job Details) page that shows a job description of a job posting. In this example, the linking page 230 may be a JD page. In another embodiment, the linking page can be a JSERP (Job Search Engine Result Page) showing a search result that includes one or more job postings. Generally, the job posting 232 may include an employer name (e.g., Plume Design), a job title (e.g., senior data scientist), a job description, or a job location (e.g., Palo Alto, Calif.).

In some embodiments, links 240A-240C to linked-to pages are presented in a particular panel that can be visually distinguished from the main panel. Links 240A-240C may be relevant to job posting 232 in its attributes such that the job characteristics, job requirements, job skills, salary requirements, or job hours may be similar. As shown in FIG. 2A, link 240A illustrates a related job that has at least two similar attributes such as an identical title (e.g., Senior Data Scientist) or nearby location (e.g., Santa Clara). Other links may illustrate related jobs that share similar attributes in different characteristics such as the size of the companies or connection data between the users who are associated with the companies. Upon clicking these links, a new page that has one or more job postings with similar job attributes is caused to be presented.

FIG. 2B is a screen snapshot of a second example computer-generated graphical user interface that displays a linking page 212 and links 215A, 215B, 215C, 220A, 220B, 220C to linked-to pages. In an embodiment, the linking page 212 may comprise a plurality of selectable search results 210A, 210B, 210C, each associated with a different job posting. In this example, the linking page 212 may be a J-SERP page (e.g., Job Search Engine Result Page) that includes one or more job postings as search results that are related to the search inquiry (e.g., data scientist) and may also include popular searches that can be generated from the job search engine.

Each of links 215A-215C point to respective linked-to pages, each associated with a different page with one or more job postings. In some embodiments, the linked-to pages can be a JSERP, generating a JSERP-to-JSERP linking between the linking page and the linked-to page. Other linking of pages such as a JD-to-JSERP or a JD-to-JD may be available based on the link configuration.

In some embodiments, each link may correspond to different job attributes such as job location (e.g., San Francisco jobs, Mountain view jobs, Menlo Park jobs), job title (e.g., Associate scientist jobs, Research scientist jobs), or employer name (e.g., LinkedIn). Upon clicking a link that has a particular job attribute, a new web page with the particular job attribute may be generated. For example, upon clicking the "San Francisco jobs" 215A, a new page with one or more "San Francisco" jobs may be generated. The job location is not limited to one region but can include many different regions that are proximate to each other. The job location attribute included in the link may be based on the search result or the initial search query. For example, if the user searched for a job in Palo Alto in its initial search, nearby location jobs (e.g., San Francisco, San Jose) may be presented as links on the linking page.

In another example, upon clicking the "Associate Scientist jobs" 220A, another page with one or more "Associate Scientist" jobs may be generated. The job title can be identical to the search query (e.g., data scientist). In another embodiment, the job titles described in links can be related a search query but may be different from the search query (e.g., Research Technician).

FIG. 2C is a screen snapshot of a third example computer-generated graphical user interface that displays a linking page 224 and links 225A, 225B, 225C that include one or more different types of job attributes.

In an embodiment, each of links 225A-225C corresponds to a page with one or more job postings that share job attributes described in links. Links 225A-225C may include more than one type of job attributes, such as a job title and a job location. For example, link 225A includes a job title attribute (e.g., scientist jobs) and a job location attribute (e.g., Palo Alto). In another embodiment, a link may include an employer name attribute (e.g., LinkedIn jobs) and a job location attribute (e.g., Mountain View).

In some embodiments, one or more web crawlers analyze web pages to generate searchable indexes and follow one or more links in each web page to discover additional web pages to analyze. A web crawler extracts content from each linkable web page. A web crawler calculates a PageRank for each web page based on the page's link structure, content, and popularity and builds an index to allow users to search across multiple indexed web pages. Ultimately, the linking pages 212, 224, 230 may be dynamically generated for guest users of a content platform (e.g., a job posting platform), facilitating easy navigation of the content platform.

4. Functional Description

Figure 3:
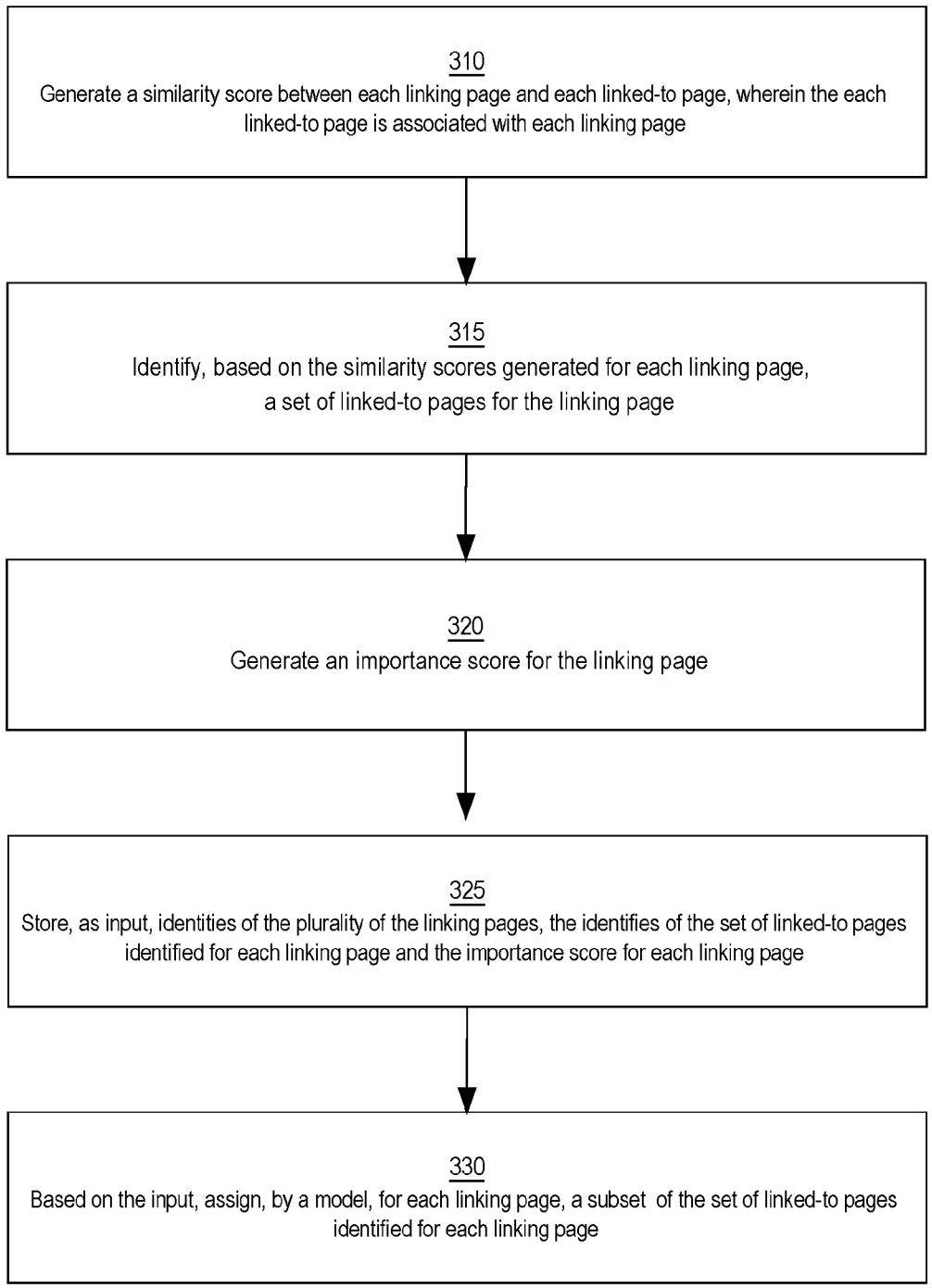
FIG. 3 is a flow diagram that depicts processes for optimizing links to electronic content, in an embodiment.

FIG. 3 is a flow diagram that depicts a process for optimizing links to electronic content, in an embodiment. In some embodiments, the process 300 may be performed in a backend server as a batch process.

At block 310, for each linking page of multiple linking pages, a similarity score is generated between the linking page and each linked-to page of multiple possible linked-to pages. In some embodiments, similarity scores can be generated based on a plurality of attributes of the job postings. For example, the plurality of attributes can include employer information, location information, or job title information. These attributes can be collected and compared against each other to determine similarity scores of the job postings. For example, title-to-title matching can be available for a similarity score for a JSERP-to-JSERP link. A page with a "data scientist" job posting can be compared with another page with a "date scientist" job posting to determine how similar the job postings are in its characteristics.

In one embodiment, one of the multiple attributes includes job skills that can be used to generate a data foundation for similarity. For example, similarity scores can be generated based on matching the skills of one job posting to the skills of another job posting. A job posting that shares similar job skills is likely to be determined to have a higher similarity score. In some embodiments, similarity scores can also be generated using a relevance score algorithm that is specific to types of links. For example, JD-to-JD relevance score can be based on the string similarity of the JD titles.

At block 315, based on the similarity scores generated for each linking page, a set of linked-to pages for each linking page can be identified. In some embodiments, a threshold value for a link is determined and compared against the generated similarity score. If it is determined that a similarity score for a particular link is higher than the threshold value, then the particular link is determined to be relevant and selected as a link to a linked-to page. On the other hand, if it is determined that a similarity score for a particular link is lower than the threshold value, then the particular link is determined to be less relevant and will not be selected as a link to the linked-to page.

In one embodiment, the set of linked-to pages can be defined as optional links. The optional links (i.e., facultative links) can be a list of all the potential links that can be put on the linking page that has one or more similar attributes such as related job titles, nearby locations, or similar employers. Optional links can limit the number of links on the linking page. The process 300 can identify a set of the most optimal optional links for the linking page.

In a related embodiment, a set of obligatory links can be selected. The obligatory links can represent a set of links that must be included on the linking page. The obligatory links may represent a set of the most relevant and similar jobs to the search result.

In some embodiments, a set of prohibitory links can be identified. The prohibitory links can include a set of links that is least relevant and least optimal to be presented as links on a linking page. When a particular job is determined to be associated with a prohibitory link, it may not be presented as a link on the linking page. A prohibitory link may be one that has a similarity score that is less than a particular threshold value. A link may be prohibitory for one linking page, optional for another linking page, and obligatory for another linking page.

At block 320, an importance score is generated. In one embodiment, the importance score is generated based on a search volume of the linking page (e.g., a particular job posting). The search volume for the linking page can be retrieved from a third-party search engine provider or a third-party search engine optimization provider. In some embodiments, search volume can be determined based on a keyword (e.g., a particular job title) or the number of times a particular search phrase has been used by end users.

At block 325, identities of linking pages, identities of a set of linked-to pages identified for each linking page, and the importance score for each linking page are stored as input in memory. The identities of the pages may include a page identification that is associated with a particular page and a particular job posting.

At block 330, a subset of the set of linked-to pages is assigned by a model based on the input. In some embodiments, the model is an optimization model using constraints of links and can include one or more algorithms such as a Value Iteration algorithm; however, the model algorithms are not limited to the listed examples. In some embodiments, any page ranking algorithm can identify rankings of the pages to determine the relevance and authority of pages. The Value Iteration algorithm can further optimize the link structures. In some embodiments, the link structure can refer to optimizing the structure of a job posting platform website graph, so it is optimized for search engine crawlers that browse the web to provide up-to-date data to the search engine.

After block 330, a subset of the set of linked-to pages identified for each linking page is determined and included as links on the linking page. In some embodiments, the subset of the set of linked-to pages may be associated with nodes that include outbound links to the nodes associated with linking page. The constrained structure of nodes generated based on the model can configure a node or link structure more optimized by optimizing a utility function. The constrained link structure can increase organic traffic on a job posting platform from a search engine page by increasing the search engine ranking of pages using the optimization model that is described in other sections of the disclosure.

In one embodiment, linking of pages based on internal link structure can maximize a page's ranking (e.g., PageRank), which is weighted by an importance metric. In another embodiment, linking of pages based on internal link structure can maximize the number of inbound links to pages weighted by an importance metric and maximize a notion of equity by ensuring all pages have some inbound links.

In one embodiment, the input comprises a minimum number of linked-to pages and the model ensures, for optimization, that the number of linked-to pages in the subset of the set of linked-to pages is greater than the minimum number. The number of links to the linked-to pages may be determined based on a plurality of criteria such as constraints associated with different types of links. For example, the different types of links may include a job page, a company page or a blog post; however, the types of links are not limited to the listed examples. In one example, the job page may include a JSERP page (Job Search Engine Result Page), a JD page (Job Details), or a location hub page.

In some embodiments, a type-to-type link can be determined. For example, a link between the JSERP and JSERP may be determined by matching the JSERP and JSERP based on occupation and title, and ranking the number of postings, applicants, views or geographic distance. This describes one example of type-to-type link matching, and another matching of links based on job attributes may be available.

In one embodiment, the input may include a first minimum number of linked-to pages of a first type of linked-to page and a second minimum number of linked-to pages of a second type of linked-to page. The second type of linked-to page may be different from the first type of linked-to page. For example, the second type of linked-to page can be a JD and the first type of linked-to page can be a JSERP. In another example, the second type of linked-to page can be a company page and the first type of linked-to page can be a job page. Any combination of types of links may be configured.

The model ensures that the number of pages of the subset of the set of linked-to pages is dictated based on the first minimum number of linked-to pages of the first type of linked-to page and the second minimum number of linked-to pages of the second type of the linked-to page. The number range of the linked-to pages can be anywhere between the minimum number of linked-to pages and a maximum number of linked-to pages.

In one embodiment, the input comprises a maximum number of linked-to pages and the model ensures, for optimization, that the number of pages in of the subset of the set of linked-to pages is less than the maximum number.

In one embodiment, the input may include a first maximum number of linked-to pages of a first type of linked-to page and a second maximum number of linked-to pages of a second type of linked-to page. The model ensures that the number of pages of the subset of the set of linked-to pages is dictated based on the first maximum number of linked-to pages of the first type of linked-to page and the second maximum number of linked-to pages of the second type of the linked-to page.

5. Model Algorithms

In an embodiment, one or more algorithms such as a Value Iteration algorithm can be used to define a model. The Value Iteration algorithm may be used to optimize the link structures of multiple linking pages. However, the approach is not limited to any particular algorithm and can include other algorithms that are efficient in determining relevant electronic content.

5.1. Markov Decision Process

In one embodiment, the objective for link optimization is to maximize the weighted sum of the PageRank of the individual pages. The objective function is mathematically expressed as:

$$\max \sum_{i}^{n} \pi_i r_i$$

i indexes a page (i∈{1, 2, . . . , n}, $\pi_i$ denotes the PageRank of page i, and $r_i$ denotes the importance score of page i. Decision variables are denoted as $x_{ij}$ where $x_{ij}=1$ if it is linked from page i to page j and 0 otherwise. One general PageRank optimization approach is described in "*Ergodic Control and Polyhedral approaches to PageRank Optimization*," in the names of O. Fercoq et al. (2010) which is incorporated herein by reference as if fully disclosed herein (hereinafter "[1]").

The set of possible links for each page is divided into three sets: facultative links, obligatory links and prohibited links. Facultative links are those links that are optional to be included on the page and any subset of the facultative links is selected to be included on the web page. Obligatory links are links that must exist on the page (for example: a link to the website's home page). Prohibited links are not allowed on the page (for example: a page cannot link to another page with irrelevant content).

The optimization problem can be expressed as a Markov Decision Process (MDP), as in [1]. MDP is a mathematical model that can be solved by one or more algorithms. With respect to MDP in [1], additional constraints are added to the MDP. The total number of links per page is constrained, links are further divided into "types" and the minimum and maximum number of pages from each link are constrained. For example, a job posting page not only links to other job posting pages but also links to job search result pages.

5.2. Value Iterations and Variables

In some embodiments, the Markov Decision Process is solved by a Value iteration algorithm. Value iteration is scalable and works well for large problem instances. Value iteration may require taking a maximum over an infinite set of points. In typical implementations of Value iteration, the maximum is taken by a simple exhaustive search over a finite number of actions. One approach could be to take the maximum via Linear programming but there is a faster method developed where the facultative links are ordered and added in order until a termination condition is reached. Adding facultative links in this greedy way is optimal.

The value iteration algorithm provided in [1] is expanded by including dangling nodes and nodes with no obligatory links. A constraint on the minimum and the maximum number of links of each type that can be chosen from the facultative links can also be introduced. To implement this constraint, counters are used to track the number of links of each type. Links are added in the same order as [1] until the minimum number of links is reached and then until either reaching the optimality condition or the maximum number of allowed links.

Julia code (which can serve as pseudocode due to its readability) for the value iteration algorithm is provided below. The function inputs are:

a. n: the number of pages
b. r: the vector of page importance values
c. facultative links: a map from node i to a list of nodes that can be linked to
d. obligatory links: a map from node i to a list of nodes that must be linked to
e. eps: a convergence threshold
f. alpha: the PageRank parameter, a pageType: an integer representing the page type. There should be a mapping defined from page type description→pageType Int e.g. JD→0, JSERP→1. Although this is less convenient than storing the string for page type, we use an Int to save memory.

pageImportance: the importance of the page (high importance pages will be assigned more PageRank)

```
function pagerank_value_iteration_constrained(n, r, facultative_links, obligatory_links,
node_types, edge_limits; eps = 1e-8, alpha = 0.85)
  T = zeros(n)
  selected_links = Dict{Int64, Array {Int64 }}( )
  while true
    T_tm1 = copy(T)
    sum_tm1 = sum(T_tm1)
    for i = 1:n
      k = 1
      obligatory_links_i = copy(get(obligatory_links, i, [ ]))
      facultative_links_i = get(facultative_links, i, [ ])
      n_obligatory_i = size(obligatory_links_i, 1)
      n_facultative_i = size(facultative_links_i, 1)
      n_obligatory_per type = Dict{Int64, Int64}( )
      for dest_type in keys(edge_limits[i])
        n_obligatory_per_type[dest_type] =0
      end
      for j in obligatory_links_i
        n_obligatory_per_type[node_types[j]] = n_obligatory_per_type[node_types[j]]+ 1
      end
      # is this a dangling node?
      if (n_obligatory_i + n_facultative_i) == 0
        T[i] = r[i] + alpha / n * sum_tm1
        continue
      end
      potential_r_i = T_tm1[facultative_links_i]
      potential_perm = sortperm(potential_r_i, rev=true)
      # we select the optimal action using a greedy approach
      while k <= n_facultative_i
        dest_type = node_types[facultative_links_i[potential_perm[k]]]
        if (n_obligatory_per_type[dest type]< edge_limits[i][dest_type][1]) ||
           ((n_obligatory_per_type[dest_type] < edge_limits[i][dest_type][2])
           && ((1 / n_obligatory_i * sum(T_tm1[obligatory_links_i]) <
potential_r_i[potential_perm[k]]) || (n_obligatory_i == 0 && sum_tm1 < n *
potential_r_i[potential_perm[k]])))
          push!(obligatory_links_i, facultative_links_i[potential_perm[k]])
          n_obligatory_i = n_obligatory_i + 1
          n_obligatory_per_type[dest_type] = n_obligatory_per_type[dest_type] + 1
        end
        k = k + 1
      end
      if n_obligatory_i == 0
        T[i] = r[i] + alpha / n * sum_tm1
      else
        T[i] = r[i] + alpha / n_obligatory_i * sum(T_tm1[obligatory_links_i])
      end
      selected_links[i] = obligatory_links_i
    end
    delta = maximum(abs.(T-T_tm1))
    println(delta)
    if delta < eps
      break
    end
  end
  return T, selected links
end
```

5.3 Nodes and Edges Schema and Data Validation

In this section, nodes and edges for link structures are described to illustrate an example engineering architecture. For example, the node's schema is as follows:

nodeID: a unique integer to identify a single webpage (primary key)

originalId: the ID originally used by the page e.g. jobPostingId for JDs toJd_min: the minimum number of links to JD pages from this page. Note that if the edges list contains less links to JDs than this number then the page will have less than this number of links.

toJd_max: the maximum number of links to JD pages from this page.

to<type>_<min,max>: the same as above, but for all other page types. So there will be 2*Number of Page Types columns in total to define the minimum and maximum number of links per page type.

The edge schema is as follows:
srcNodeID: the source nodeID
destNodeID: the destination nodeID
relevance: the relevance score for how relevant the content of the destination node is to the source node.
obligatory: a boolean value that is TRUE if the link must be used.

The nodes and edges may be associated with properties that need to be satisfied before passing the data to an optimization function. The data validation properties for nodes are as follows:

The node list should contain exactly one row for each webpage. There should be no duplicates.
The nodes should be labeled with a contiguous nodeId from 1 to the number of nodes so that array indexing can be performed inside the optimization function.
There cannot be any NULL values. If importance data is missing, it should be imputed or given a default value.

The data validation properties for edges are as follows:
The edge list contains all the facultative links so any of these links may be selected by the optimization algorithm. If a link from the original Hadoop Distributed File System (HDFS) data is not relevant enough, it should be deleted from this dataframe by filtering by relevance before passing to the optimization.
There should be no duplicates.
The relevance can be NULL because relevance is not used by the optimization algorithm but only include links in this dataframe that should be considered (i.e., they are relevant "enough").
The srcNodeId and destNodeId must appear in the nodes list.

6. Hardware Overview

Figure 4:
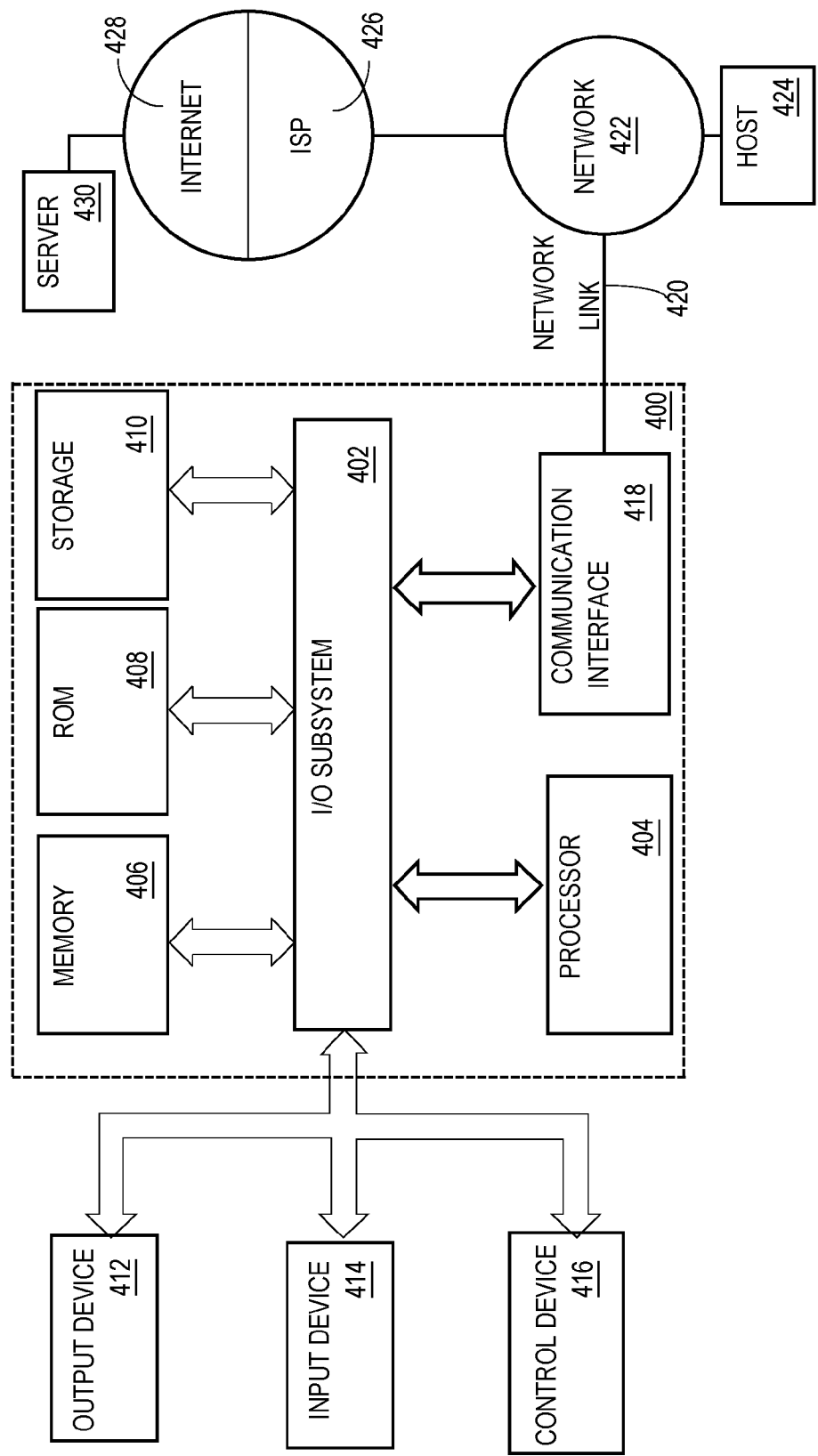
FIG. 4 is a block diagram that illustrates a computer system upon which an embodiment of the invention may be implemented.

FIG. 4 is a block diagram that illustrates an example computer system with which an embodiment may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disk such as CD-ROM or DVD-ROM, and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on output device (e.g., display) 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC, GPU, or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server computer 430 may be coupled to internet 428. Server 430 broadly represents any computer, data center, virtual machine or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using structured query language (SQL) or no SQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A computer-implemented method for generating a plurality of linking pages that are optimized for presentation as a search results page of a search performed by a third-party search engine, the method comprising:
   for each linking page of the plurality of linking pages:
   generating a similarity score between said each linking page and each linked-to page of a plurality of linked-to pages, wherein said each linked-to page is associated with said each linking page;
   identifying, based on the similarity scores generated for said each linking page, a set of linked-to pages for said each linking page;
   generating an importance score for the linking page;

storing, as input, identities of the plurality of linking pages, identities of the set of linked-to pages identified for each linking page of the plurality of linking pages, the importance score for each linking page of the plurality of linking pages, a first minimum number of linked-to pages of a first type of linked-to page, and a second minimum number of linked-to pages of a second type of linked-to page;

based on the input, assigning, by a model, for each linking page of the plurality of linking pages, a subset of the set of linked-to pages identified for said each linking page, wherein the model ensures that the number of pages in the set of linked-to pages is determined based on the first minimum number of linked-to pages of the first type of linked-to page and the second minimum number of linked-to pages of the second type of the linked-to page;

wherein the method is performed by one or more computing devices.

2. The computer-implemented method of claim 1, further comprising:
determining a search volume of the linking page;
wherein the importance score is based on the search volume.

3. The computer-implemented method of claim 1, wherein the input comprises a maximum number of linked-to pages, and wherein the model ensures that the number of pages in the subset of the set of linked-to pages is less than the maximum number.

4. The computer-implemented method of claim 3, wherein the input further comprises:
a first maximum number of linked-to pages of the first type of linked-to page and a second maximum number of linked-to pages of the second type of linked-to page;
wherein the model ensures that the number of pages in the subset of the set of linked-to pages is dictated based on the first maximum number of linked-to pages of the first type of linked-to page and the second maximum number of linked-to pages of the second type of the linked-to page.

5. The computer-implemented method of claim 1, further comprising, prior to assigning:
ordering the subset of the set of linked-in pages based on one or more criteria.

6. The computer-implemented method of claim 1, further comprising:
identifying a set of obligatory linked-to pages for a particular linking page of the plurality of linking pages;
wherein the model ensures that the set of linked-to pages for the particular linking page includes the set of obligatory linked-to pages.

7. The computer-implemented method of claim 1, wherein the similarity score is based on one or more attributes associated with the linking page.

8. The computer-implemented method of claim 1, wherein the model is based on at least a Value Iteration algorithm.

9. One or more non-transitory computer-readable storage media storing instructions that, when executed by one or more processors, perform a method for generating a plurality of linking pages that are optimized for presentation as a search results page of a search performed by a third-party search engine, the method comprising:
for each linking page of the plurality of linking pages:
generating a similarity score between said each linking page and each linked-to page of a plurality of linked-to pages, wherein said each linked-to page is associated with said each linking page;
identifying, based on the similarity scores generated for said each linking page, a set of linked-to pages for said each linking page;
generating an importance score for the linking page;
storing, as input, identities of the plurality of linking pages, identities of the set of linked-to pages identified for each linking page of the plurality of linking pages, the importance score for each linking page of the plurality of linking pages, a first minimum number of linked-to pages of the first type of linked-to page, and a second minimum number of linked-to pages of the second type of linked-to page;
based on the input, assigning, by a model, for each linking page of the plurality of linking pages, a subset of the set of linked-to pages identified for said each linking page, wherein the model ensures that the number of pages in the subset of the set of linked-to pages is dictated based on the first minimum number of linked-to pages of the first type of linked-to page and the second minimum number of linked-to pages of the second type of the linked-to page;
wherein the method is performed by one or more computing devices.

10. The one or more non-transitory computer-readable storage media of claim 9, when executed, the method further comprising:
determining a search volume of the linking page;
wherein the importance score is based on the search volume.

11. The one or more non-transitory computer-readable storage media of claim 9, wherein the input comprises a minimum number of linked-to pages, and wherein the model ensures that the number of pages in the subset of the set of linked-to pages is greater than the minimum number.

12. The one or more non-transitory computer-readable storage media of claim 11, wherein the input further comprises:
a first minimum number of linked-to pages of a first type of linked-to page and a second minimum number of linked-to pages of a second type of linked-to page;
wherein the model ensures that the number of pages in the set of linked-to pages is dictated based on the first minimum number of linked-to pages of the first type of linked-to page and the second minimum number of linked-to pages of the second type of the linked-to page.

13. The one or more non-transitory computer-readable storage media of claim 9, when executed, the method further comprising, prior to assigning:
ordering the subset of the set of linked-in pages based on one or more criteria.

14. The one or more non-transitory computer-readable storage media of claim 9, when executed, the method further comprising:
identifying a set of obligatory linked-to pages for a particular linking page of the plurality of linking pages;
wherein the model ensures that the set of linked-to pages for the particular linking page includes the set of obligatory linked-to pages.

15. The one or more non-transitory computer-readable storage media of claim 9, wherein the similarity score is based on one or more attributes associated with the linking page.

16. The one or more non-transitory computer-readable storage media of claim 9, wherein the model is based on at least a Value Iteration algorithm.

* * * * *